(12) United States Patent
Asaka et al.

(10) Patent No.: US 6,656,632 B2
(45) Date of Patent: Dec. 2, 2003

(54) CELL MODULE STRUCTURE

(75) Inventors: Satoru Asaka, Wako (JP); Kenji Matsumoto, Wako (JP); Toshiyuki Matsuoka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 214 days.

(21) Appl. No.: 09/849,590

(22) Filed: May 7, 2001

(65) Prior Publication Data
US 2002/0006544 A1 Jan. 17, 2002

(30) Foreign Application Priority Data

May 12, 2000 (JP) .......................... 2000-140834
Dec. 18, 2000 (JP) .......................... 2000-383402

(51) Int. Cl.⁷ .......................... H01M 2/26; H01M 2/30; H01M 2/10
(52) U.S. Cl. .......................... 429/178; 429/99; 429/158; 429/159
(58) Field of Search .......................... 429/158, 159, 429/99, 178; 439/500

(56) References Cited

U.S. PATENT DOCUMENTS

| | | | | |
|---|---|---|---|---|
| 5,104,752 A | * | 4/1992 | Baughman et al. | 429/178 X |
| 5,441,829 A | * | 8/1995 | Attwood et al. | 429/158 |
| 5,985,480 A | * | 11/1999 | Sato et al. | 429/158 X |

FOREIGN PATENT DOCUMENTS

DE     220317     3/1910

* cited by examiner

Primary Examiner—John S. Maples
(74) Attorney, Agent, or Firm—Arent Fox Kintner Plotkin & Kahn, PLLC

(57) ABSTRACT

A cell module structure in which cylindrical cells are connected to each other via a terminal connecting portion of a bus bar plate. An inner cell terminal and an outer cell terminal having different polarities are coaxially aligned at an end of the cell. An inner connecting terminal and an outer connecting terminal corresponding to the inner cell terminal and the outer cell terminal of the cell are coaxially aligned in the terminal connecting portion of the bus bar plate. The inner cell terminal and the outer cell terminal of the cell are connected to the terminal connecting portion of the bus bar plate in a connected condition in which the outer cell terminal of the cell contacts the outer connecting terminal of the terminal connecting portion, and the inner cell terminal contacts the inner connecting terminal.

10 Claims, 13 Drawing Sheets

# CELL MODULE STRUCTURE

BACKGROUND OF THE INVENTION

1. Technical Field

The present invention relates to cell module structures equipped in electric cars, hybrid electric cars, and the like, as a driving power supply. The cell modules in the invention include any type of charging element device, including cells such as nickel hydrogen batteries and lithium batteries; and energy storage devices such as double layered capacitors (ultra-capacitors).

2. Background Art

As a cell module in which plural cells are serially connected to each other, a conventional one is exemplified in which plural cylindrical or rectangular cells having a positive terminal and a negative terminal arranged at an end thereof are arranged in parallel, and the positive terminal and the negative terminal in adjoining cells are connected to each other via a bus bar so that the cells are connected to each other. The bus bar is generally mounted to the terminals by bolts or nuts in the assembly of the cell module.

FIG. 18 shows an example of a cell 100 and a bus bar 110 for a conventional cell module. In the example, a positive terminal 101 and a negative terminal 102 are arranged and project at an end of a cylindrical cell 100. The bus bar 110 consists of a positive bus bar 111 and a negative bus bar 112, which are insulated from each other and are penetrated by bolts 120 and 120, which are screwed to the positive terminal 101 and the negative terminal 102 so as to secure and serially connect them to each other.

In the conventional cell module structures in which plural cells are connected to each other according to the connecting feature in FIG. 18, the labor for connecting the terminals by a bus bar is substantial since the task in which the bus bar is positioned with respect to the terminal and then the bolt is secured thereto must be repeated. Furthermore, a large space for operating a securing tool is required for securing the bolts, and care to avoid short circuiting by the tool is necessary, and the connecting working is therefore further complicated.

In order to reduce the contact resistance in the connecting portion, the terminal and the bus bar must be rigidly secured. However, the load exerted on the connecting portion increases due to deformation thereof due to vibration and temperature changes, and the condition of the connection may therefore be deteriorated. In order to reduce the load exerted on the connecting portion, it has been proposed that the cells be supported by holding members. However, this proposal results in increase in the number of parts and complication of the structure.

In general, the area occupied by overall the cell and the cell module is readily large in the cell in which a positive terminal and a negative terminal are arranged at an end thereof, and this feature is disadvantageous for vehicles which are required to effectively utilize limited space.

It has been proposed to change the shapes of the positive terminal and the negative terminal to avoid misassembly in which the positive terminals are connected or negative terminals are connected. However, since the terminals are usually formed as protrusions, misassembly can not be completely avoided. In addition, since the terminals are formed as protrusions, the terminals are often damaged by mishandling thereof. As a result, sufficient electrical contact cannot be obtained, or the terminals may short circuiting in some cases.

SUMMARY OF THE INVENTION

Therefore, an object of the present invention is to provide cell module structures which can satisfy the following requirements.

(1) Cells can be easily connected and electrical resistance can be reduced.

(2) Fine layout of cells can be performed and space is used effectively.

(3) Misassembly, damage and short circuiting of cells can be avoided.

The present invention provides a cell module structure in which cylindrical cells are connected to each other via a terminal connecting portion of a bus bar plate, wherein an inner cell terminal and an outer cell terminal having different polarities are coaxially aligned at an end of the cell; an inner connecting terminal and an outer connecting terminal corresponding to the inner cell terminal and the outer cell terminal of the cell are coaxially aligned in the terminal connecting portion of the bus bar plate; the inner cell terminal and the outer cell terminal of the cell are connected to the terminal connecting portion of the bus bar plate in a connected condition in which the outer cell terminal of the cell contacts the outer connecting terminal of the terminal connecting portion, and the inner cell terminal contacts the inner connecting terminal. The invention includes a feature in which the terminal connecting portion of the bus bar plate has a contacting portion with each cell terminal of the cell, the each cell terminal is welded or adhered to the contacting portion. The terminals (positive and negative terminals) according to the invention are coaxially aligned as the inner cell terminal and the outer cell terminal at an end of the cell. The inner connecting terminal and the outer connecting terminal corresponding to the terminals of the cell are arranged in the terminal connecting portion of the bus bar plate. Each terminal of the cell is brought into contact with a terminal of the terminal connecting portion, and thus a module is formed. In the invention, since the positive and negative terminals are coaxially aligned, the cell is easily connected to the terminal connecting portion, and the distance for electrical transmission can be extremely short, thereby reducing the electrical resistance. In addition, the space occupied by overall the cell and the cell module can be reduced, so that limited space can be effectively utilized, and fine layout can be achieved when the plural cells are arranged. The connecting operation can be more easily performed since the operator need not confirm the polarity of the terminal of the cell in connecting the cell to the terminal connecting portion, and misassembly of the same polarity and short circuiting due to this can be avoided.

The present invention further provides a more specific cell module structure, wherein: an inner cell terminal and an outer cell terminal having different polarities are coaxially aligned at an end of the cell, at least the outer cell terminal is formed into a cylinder and has a screw portion on an inner surface or an outer surface thereof; an inner connecting terminal and an outer connecting terminal corresponding to the inner cell terminal and the outer cell terminals of the cell are coaxially aligned at the terminal connecting portion of the bus bar plate, and a screw portion screwed into the screw portion of the outer cell terminal is formed at the outer connecting terminal; the inner cell terminal and the outer cell terminal of the cell are connected to the terminal connecting portion of the bus bar plate in a connected condition in which the screw portion of the outer cell terminal in the cell is screwed to the screw portion of the outer connecting terminal in the terminal connecting portion, so that the inner cell terminal is brought into contact with the inner connecting terminal.

According to the invention, the cell is rotated around the axis thereof, the screw portion provided in the outer cell terminal of the cell is screwed and secured to the screw portion provided in the outer connecting terminal in the terminal connecting portion. In this construction, the outer cell terminal of the cell contacts the outer connecting terminal of the terminal connecting portion by screwing. The inner cell terminal of the cell is brought onto contact with the inner connecting terminal of the terminal connecting portion by the action of the screw. For this connected condition, the inner cell terminal and the outer cell terminal are connected to the terminal connecting portion of the bus bar plate.

The present invention further provides another specific cell module structure, wherein: an inner cell terminal and an outer cell terminal having different polarities are coaxially aligned at an end of the cell, the inner cell terminal is formed into a column and has a screw portion on an outer surface thereof; an inner connecting terminal and an outer connecting terminal corresponding to the inner cell terminal and the outer cell terminals of the cell are coaxially aligned at the terminal connecting portion of the bus bar plate, and a screw portion screwed into the screw portion of the inner cell terminal is formed at the inner connecting terminal; the inner cell terminal and the outer cell terminal of the cell are connected to the terminal connecting portion of the bus bar plate in a condition in which the screw portion of the inner cell terminal in the cell is screwed to the screw portion of the inner connecting terminal in the terminal connecting portion, so that the outer cell terminal is brought into contact with the outer connecting terminal.

In the invention, the screw is formed in the inner cell terminal, and the cell is rotated around the axis thereof, so that the screw portion of the inner cell terminal of the cell is screwed and secured to the screw portion of the inner connecting terminal of the terminal connecting portion. For this operation, the inner cell terminal of the cell contacts the inner connecting terminal of the terminal connecting portion by the screw securing. The outer cell terminal of the cell is brought into contact with the outer connecting terminal of the bus bar plate by the screw action of the cell. In this connected condition, the inner cell terminal and the outer cell terminal of the cell are connected to the terminal connecting portion of the bus bar plate.

According to the connected condition of the terminals by the screw securing, sufficient contact area between the terminals can be obtained and the distance for electrical transmission can be extremely short, so that the electrical resistance can be greatly reduced. Furthermore, since the rigidity of the connected condition between the terminal of the cell and the terminal of the terminal connecting portion can be improved, the connected condition of the terminals can be rigidly maintained, and the electrical resistance can be reduced. In particular, in the case in which the screwing portion of the cell is provided to the outer cell terminal, the rigidity in the connected condition is improved more than in the case in which the screwing portion is provided at the inner cell terminal, so that the above function can be more adequately obtained.

In addition, the cell can be connected to the terminal connecting portion merely by screwing the cell to the terminal connecting portion of the bus bar plate, so that securing members such as bolts and nuts, and securing tools, are not needed. Therefore, the connecting operation can be performed with great ease, and the space necessary for the operation can be reduced. In addition, the space occupied by overall the cell and the cell module can be reduced, so that limited space can be effectively utilized. The connecting operation can be further facilitated since the operator need not confirm the polarity of the terminal of the cell in connecting the cell to the bus bar plate, and misassembly of the same polarity and short circuiting due to this can be avoided.

The essential feature of the invention is the connecting structure for the cell to the terminal connecting portion of the bus bar plate, and this feature is greatly preferable for constructing a cell module connecting plural cells. According to the preferable feature of the invention, the plural terminal connecting portions are straightly aligned on a surface of the bus bar plate, and the plural cells are connected to the terminal connecting portions in the connected condition. According to another preferable feature of the invention, and the plural terminal connecting portions are straightly aligned on both surfaces of the bus bar plate, and the plural cells are connected to the terminal connecting portions in the connected condition.

The distance between the adjoining cells can be shortened by serially connecting the plural cells as in the above, fine layout of the cells can be obtained, and whole of the cell module can be compact and the space can be effectively utilized.

The invention provides the following features.

(1) The outer cell terminal of the cell may be cylindrical, and the inner cell terminal may be disposed thereinto. The height of the outer cell terminal may be higher than that of the inner cell terminal. For this feature, the inner cell terminal is protected by the outer cell terminal. When this feature is applied to the invention in which the screw portion is formed in the inner surface of the outer cell terminal, the end surface of the inner cell terminal and screw portion of the outer cell terminal, which are essentially electric transmittal portions, will not be damaged. Alternatively, when the feature is applied to the invention in which the screw portion is formed on the outer surface of the inner cell terminal, the end surface of the outer cell terminal and screw portion of the inner cell terminal, which are essentially electric transmittal portions, will not be damaged. In both cases, problems, in which sufficient electric contact is not obtained, will be solved, and short circuiting of both terminals will be prevented.

(2) In contrast to the feature in (1), the inner cell terminal may be higher than the outer cell terminal so as to project therefrom.

(3) An insulating member may be held between the outer cell terminal and the inner cell terminal of the cell, thereby reliably preventing short circuiting. The insulating member may be higher than the outer cell terminal and the inner cell terminal so as to project therefrom. In this case, the insulating member may protect the outer cell terminal and the inner cell terminal.

(4) A conductive elastic member may be held between connecting portions of the terminals, which are brought into contact to each other rather than the contact by screws. The terminals are electrically contacted to each other via the elastic member. Herisert may be preferably used for the elastic member.

(5) A tool engaging portion for rotating the cell by a tool around the axis thereof may be provided at an end of the cell, which end is opposite to the end in which the outer cell terminal and the inner cell terminals are provided. Holes or protrusions having polygonal or star-shaped cross section may be employed for the tool engaging portion. According to this feature, when the cell is screwed and secured to the terminal connecting portion of the bus bar plate, strong securing torque can be applied to the cell by a tool such as a wrench fitted to the tool engaging portion, and the connecting strength can be improved.

(6) As an arrangement of the tool engaging portion in (5), a portion of the cell may be a polygon. Rectangular or hexagonal cross section may be applied for rotating the cell by a tool such as a cylindrical wrench. The polygonal cross section may extend over the entire length of the cell. This feature also can yield the advantages in (5).

DETAILED DESCRIPTION OF THE INVENTION (1) First Embodiment

The first embodiment of the invention will be explained hereinafter with reference to FIGS. 1 to 4.

Figure 1:
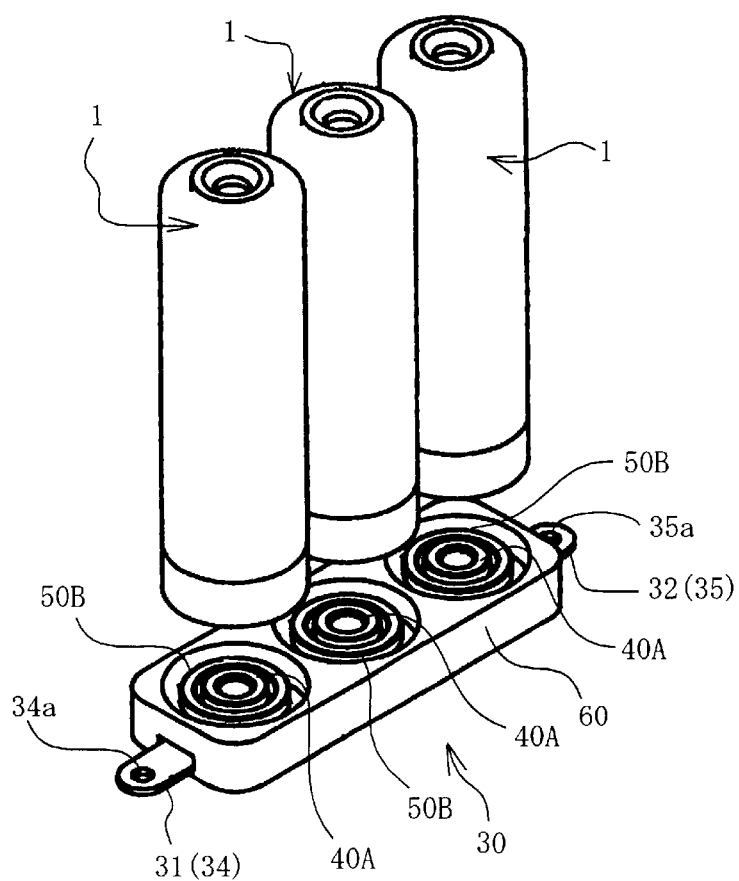
FIG. 1 is a perspective view of a cell module according to a first embodiment of the invention, which shows the condition before cells are mounted to a bus bar plate.
Figure 2:
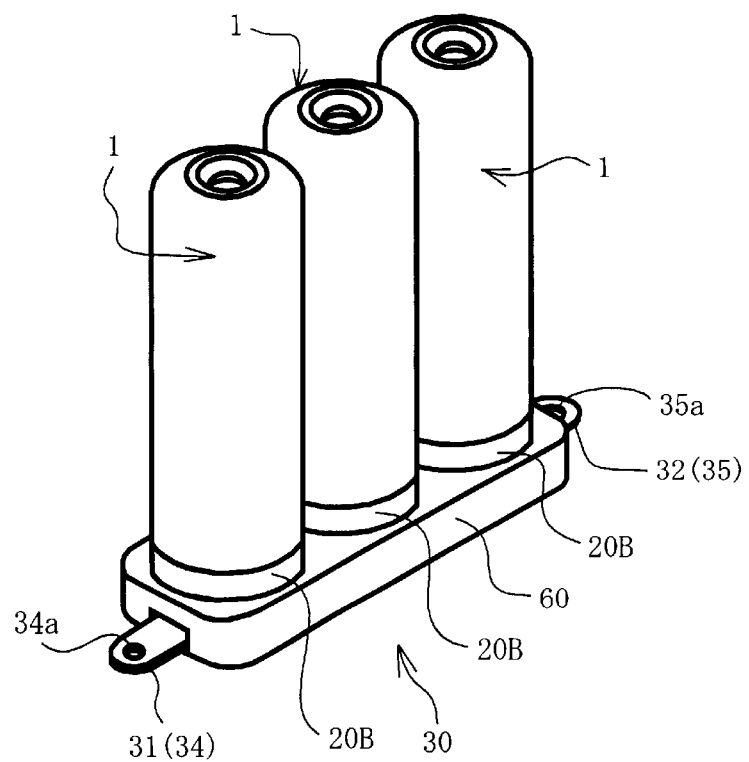
FIG. 2 is a perspective view of a cell module according to a first embodiment of the invention, which shows the condition in which cells are mounted to a bus bar plate.
Figure 3:
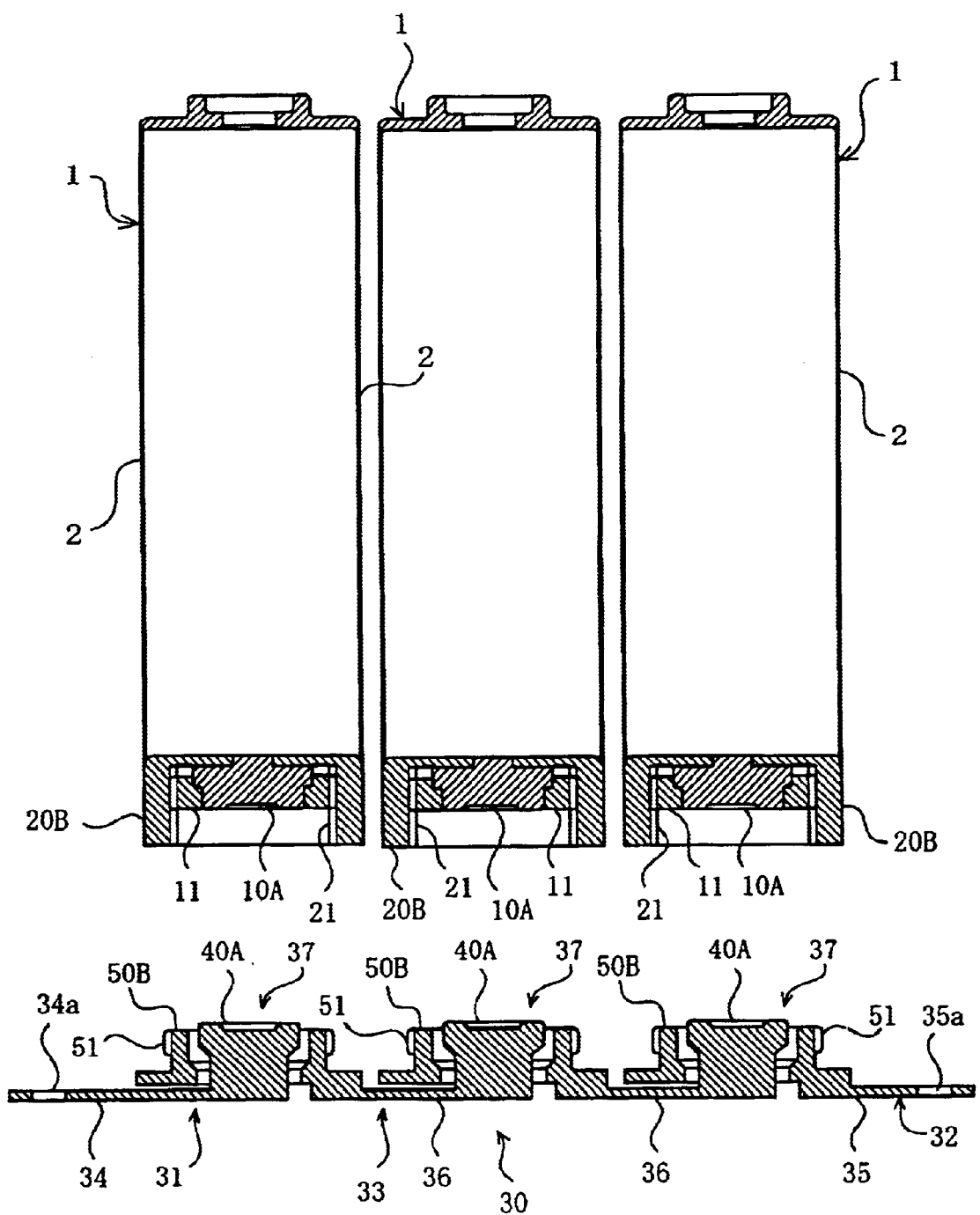
FIG. 3 is a cross section of a cell module according to a first embodiment of the invention, which shows the condition before cells are mounted to a bus bar plate.
Figure 4:
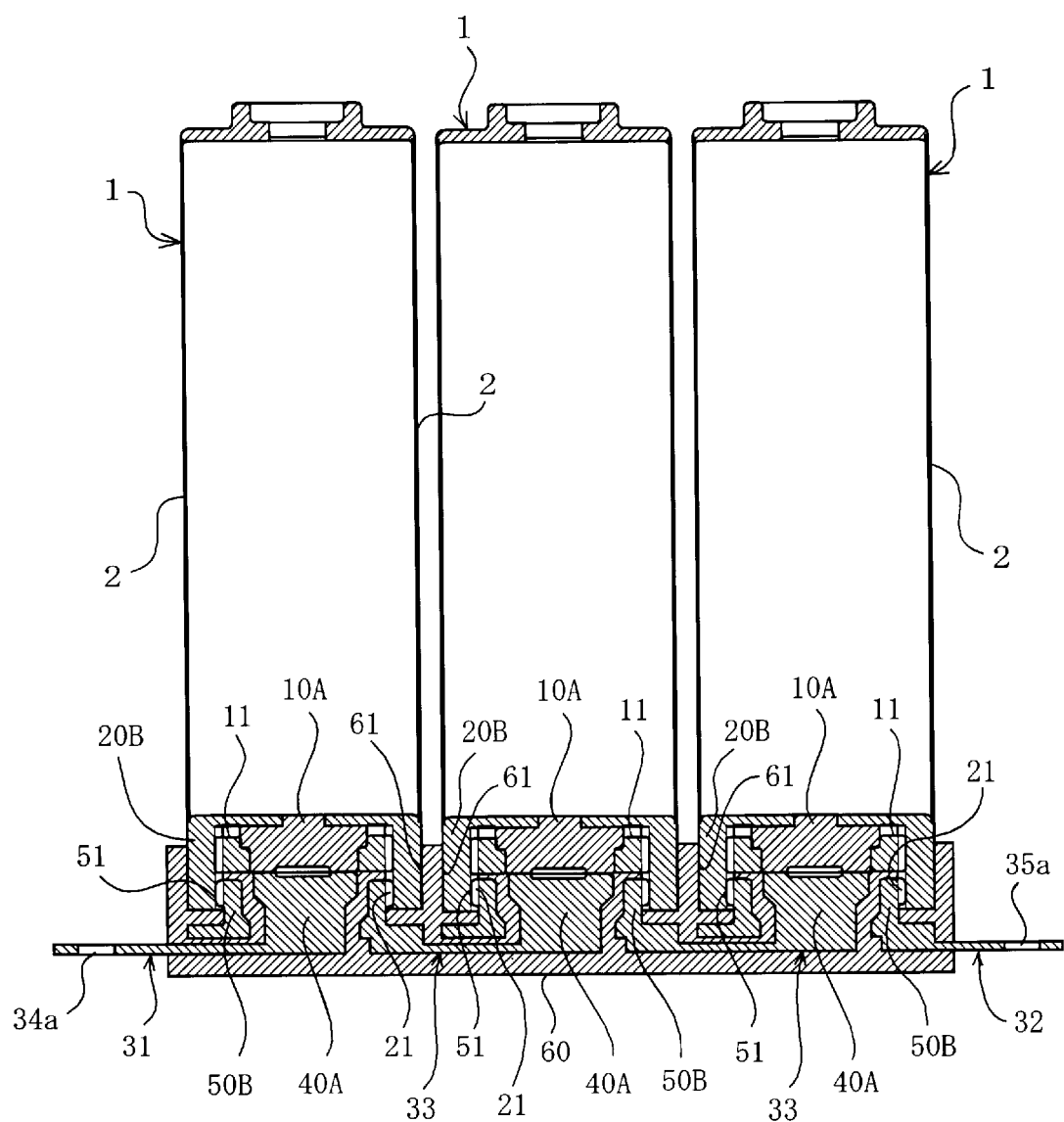
FIG. 4 is a cross section of a cell module according to a first embodiment of the invention, which shows the condition in which cells are mounted to a bus bar plate.

Reference numeral 1 in FIG. 1 is a cell, and numeral 30 is a bus bar plate to which the cell 1 is mounted. FIG. 2 is a perspective view showing the condition before the cell 1 is mounted to the bus bar plate 30. FIG. 3 is a vertical cross section of FIG. 1, and FIG. 4 is a vertical cross section of FIG. 2.

First, the structure of the cell 1 and the bus bar plate 30 will be explained with reference to FIGS. 3 and 4.

The cell 1 includes a cylindrical casing 2 in which a positive terminal plate and a negative terminal plate (not shown) are installed. A positive cell terminal 10A connected to the positive terminal plate and a negative cell terminal 20B connected to the negative terminal plate are coaxially aligned with the casing 2 at an end (lower end in FIG. 3) thereof. The negative cell terminal 20B has a cylindrical body having approximately the same diameter as that of the casing 2 and a female screw 21 on the inner surface thereof.

The positive cell terminal 10A is a projecting solid disk and is disposed in the inside of the negative cell terminal 20B. The height of the positive cell terminal 10A is lower than that of the negative cell terminal 20 so as to be embedded in the negative cell terminal 20B. An insulating member 11 is held by the positive cell terminal 10A and the negative cell terminal 20B. The insulating member 11 is fitted around the positive cell terminal 10A and is screwed to the female screw 21 of the negative cell terminal 20B. The insulating member 11 pre-mounts the positive cell terminal 10A to the cell 1.

The bus bar 30 is assembled by an end bus bar 31 for the positive terminal, an end bus bar 32 for the negative terminal, and plural (two in the embodiment) intermediate bus bar 33. The assembled condition of the bus bars 31, 32, and 33 is maintained by an insulating resin mold 60 shown in FIG. 4.

The end bus bar 31 for the positive terminal, which is disposed to the left in FIG. 3, is formed by integrally forming a bus bar body 34 and a columnar positive bus bar terminal (inner connecting terminal) 40A projecting from the surface of the end of the bus bar body 34. A through hole 34a for connecting is formed at the other end of the bus bar body 34. The end bus bar 32 for the negative terminal, which is disposed to the right in FIG. 3, is formed by integrally forming a bus bar body 35 and a cylindrical negative bus bar terminal (outer connecting terminal) 50B projecting from the surface of an end of the bus bar body 35. A through hole 35a for connecting is formed at the other end of the bus bar body 35. The intermediate bus bar 33 is formed by integrally forming a bus bar body 36, a positive bus bar terminal 40A and a negative bus bar terminal 50B, same as in the above, respectively projecting from the opposite ends of the bus bar body 36. The outer surface of the negative bus bar terminal 50B is formed with a male screw 51 which screws to the female screw 21 formed in the negative cell terminal 20B of the cell 1.

The bus bars 31, 32, and 33 are arranged in the manner as in the above, the positive bus bar terminal 40A is inserted into the negative bus bar terminal 50B from the reverse side (lower side in FIG. 3) thereof, and the bus bar bodies 34, 35, and 36 are straightly aligned, and thus the bus bar plate 30 is assembled. As shown in FIG. 3, a clearance is formed between the outer surface of the positive bus bar terminal 40A and the inner surface of the negative bus bar terminal 50B. The assembled condition is maintained by the resin mold 60. Approximately the entire clearance between the positive bus bar terminal 40A and the negative bus bar terminal 50B is filled with the resin mold 60.

In the assembled condition of the bus bars 31, 32, and 33 which are held by the resin mold 60, the height of the end surface of the negative bus bar terminal 50B is higher than the end surface of the positive bus bar terminal 40A, and is projected upward. As shown in FIG. 4, the resin mold 60 defines a recess 61 around the negative bus bar terminal 50B, to which the negative cell terminal 20B is fitted. In this embodiment, a terminal connecting portion 37 (see FIG. 3) is formed by a pair of positive bus bar terminals 40A and the negative bus bar terminals 50B which are coaxially aligned.

Next, a process for assembling a cell module by mounting the plural cells 1 to the bus bar plate 30 will be explained hereinafter. The end or head portion of the cell 1, which end is not provided with the positive cell terminal 10A and the negative cell terminal 20B, is held. The female screw 21 of the negative cell terminal 20B of the cell 1 is fitted to the male screw 51 of the negative bus bar terminal 50B of the bus bar plate 30. The cell 1 is rotated around the axis thereof in the screwing direction. The negative cell terminal 20B of the cell 1 is screwed to the negative bus bar terminal 50B of the bus bar plate 30, and the positive cell terminal 10A of the cell 1 is brought into contact with the positive bus bar terminal 40A of the bus bar plate 30. In this condition, a space for screwing remains between the negative cell terminal 20B and the negative bus bar terminal 50B. The cell 1 is further forced to rotate in the screwing direction, so that the negative cell terminal 20B is secured to the negative bus bar terminal 50B. The above operation is repeated for each cell 1, and thus the cell module shown in FIGS. 2 and 4 can be obtained.

In the cell 1, the negative cell terminal 20B of the cell 1 and the negative bus bar terminal 50B are contacted with each other by the screw securing. The positive cell terminal 10A of the cell 1 is brought into contact with the positive bus bar terminal 40A by the screwing of the cell 1. By virtue of this connection, the positive cell terminal 10A and the negative cell terminal 20B of the cell 1 are serially connected to each other via the terminal connecting portion 37 of the bus bar plate 30, and the cell module is constructed.

In the embodiment, the cell 1 is screwed to the terminal connecting portion 37, so that the positive terminal and the negative terminal are contacted to each other, and the electrical connection is made. Therefore, sufficient contact area between the terminals can be obtained and the distance for electrical transmission can be extremely short, so that the electrical resistance can be greatly reduced. Furthermore, the screwing portion of the cell 1 with respect to the bus bar plate 30 is formed in the outer negative cell terminal 20B other than the inner positive cell terminal 10A, so that the rigidity of the connected condition can be improved. Therefore, the connected condition of the terminals can be rigidly maintained, so that the electrical resistance can be further reduced. In addition, the supporting member for the cell 1 for reducing the load exerted on the connecting portion is not required, so that the number of parts is reduced and the structure can be simplified.

The positive terminal and the negative terminal of the cell 1 can be serially connected to each other merely by screwing the cell 1 to the terminal connecting portion 37 of the bus bar plate 30, so that securing members such as bolts and nuts, and securing tools, are not needed. As a result, the above operation for connecting can be performed very easily, and the space for the operation can be reduced. In addition, the space occupied by overall the cell 1 and the cell module can be reduced, so that limited space can be utilized effectively. Moreover, the number of parts can be reduced and the structure can be simple and light weight. The connecting operation can be more easily performed since the operator need not confirm the polarity of the terminal of the cell 1 in connecting the cell 1 to the bus bar plate 30, and misassembly of the same polarity and short circuiting due to this can be avoided.

In the embodiment, the distance between the adjoining cells 1 can be shortened by serially connecting the plural cells 1. Therefore, fine layout of the cells 1 can be obtained, and whole of the cell module can be compact and the space can be effectively utilized.

In the embodiment, since the height of the outer negative cell terminal 20B is higher than that of the inner positive cell terminal 10A so that the cell terminal 20B projects from the cell terminal 10A, and the female screw 21 is formed in the inner surface of the negative cell terminal 20B, the positive cell terminal 10A is protected by the negative cell terminal 20B, and the female screw 21 of the negative cell terminal 20B is not exposed outward. Therefore, the end surface of the positive cell terminal 10A and the female screw 21 of the negative cell terminal 20B will not be damaged, and problems, in which sufficient electrical contact is not obtained, may be solved. The short circuiting of the both terminals 10A and 20B may be prevented.

In the embodiment, although the female screw 21 is formed in the inner surface of the negative cell terminal 20B of the cell 1, a male screw may be formed on the outer surface of the negative cell terminal 20B instead of the above. In this case, a female screw may be formed in the inner surface of the negative bus bar terminal 50B of the bus bar plate 30, and the terminals 20B and 50B may be screwed together. To employ this structure, the diameters of the terminals 20B and 50B must be changed.

Next, another embodiment of the invention based on the first embodiment will be explained hereinafter. In this embodiment, numerals corresponding to those in FIGS. 1 to 4 are attached to the same elements as in FIGS. 1 to 4.

A. Number of Connected Cells and Arrangement

Figure 5:
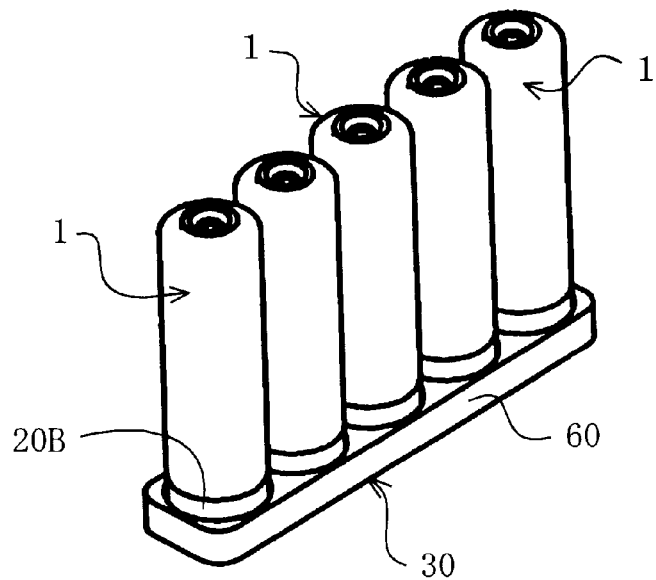
FIG. 5 is a perspective view of a cell module according to an arrangement of the first embodiment, in which the number of cells is increased.
Figure 6:
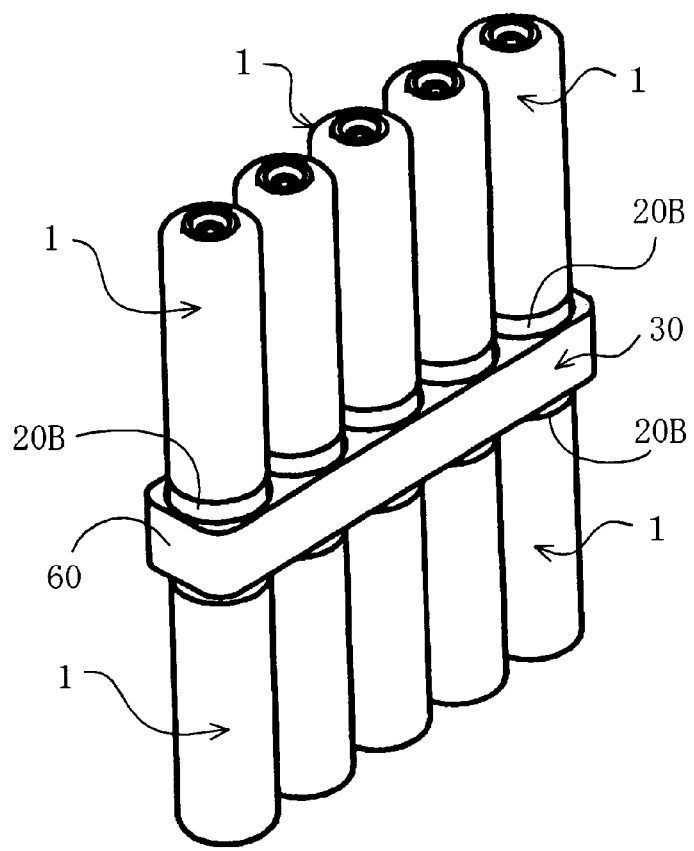
FIG. 6 is a perspective view of a cell module according to an arrangement of the first embodiment, in which the cells are arranged at both surfaces of a bus bar plate.
Figure 7:
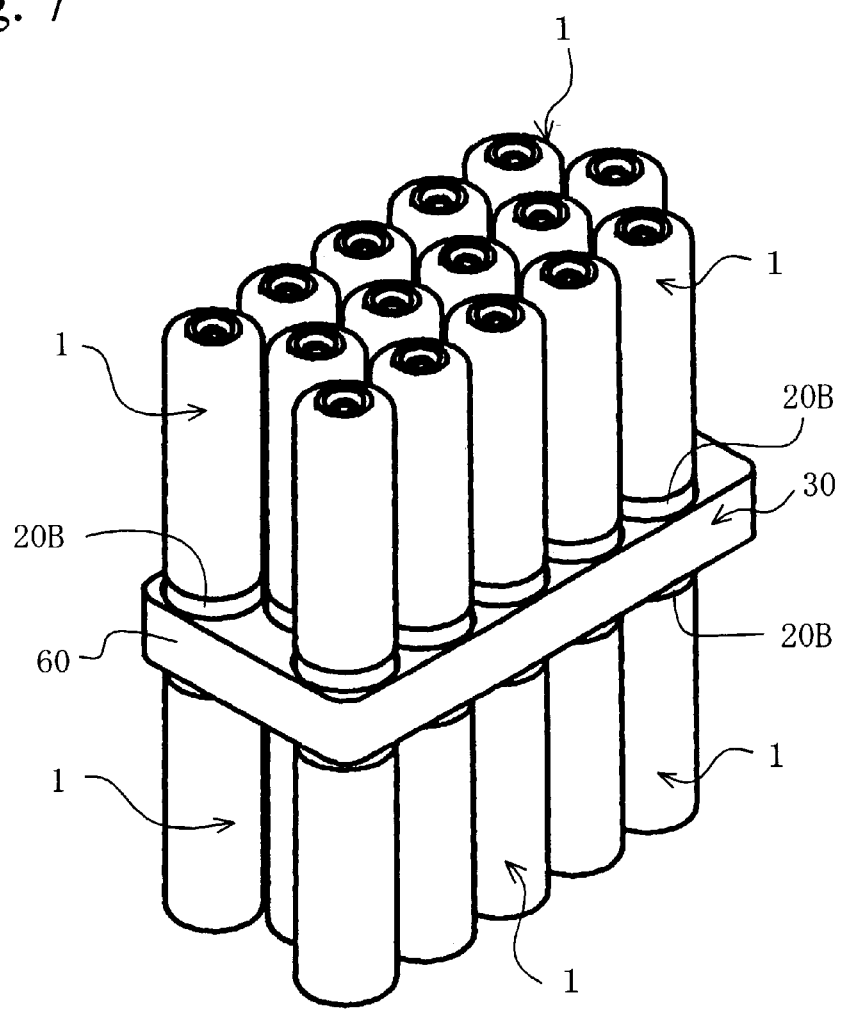
FIG. 7 is a perspective view of a cell module according to an arrangement of the first embodiment, in which the cells are arranged in a zigzag at both surfaces of a bus bar plate.

Although the number of the cells 1 is three in the first embodiment, a greater number of cells (five in this case) 1 are straightly aligned on the bus bar plate 30 in FIG. 5. Furthermore, five cells 1 are aligned on the two surfaces of the bus bar plate 30 respectively in the module in FIG. 6. Moreover, plural cells 1 are aligned zigzag on both surfaces of the bus bar plate 30 respectively in the module in FIG. 7. The cells 1 are serially connected by the bus bar plate 30 in any case.

B. Design of Bus Bar Plate

Figure 8:
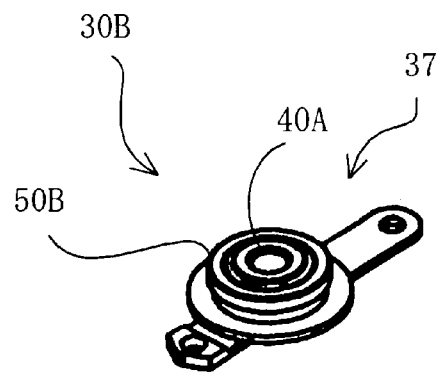
FIG. 8 is a perspective view of an arrangement of the bus bar.
Figure 9:
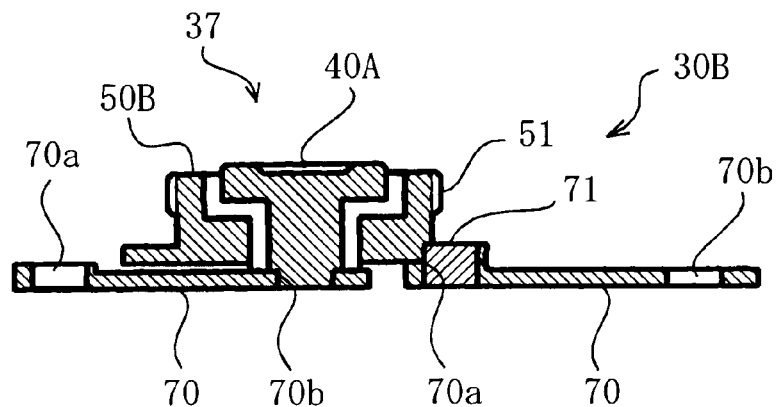
FIG. 9 is a vertical cross section of an arrangement of the bus bar.
Figure 10:
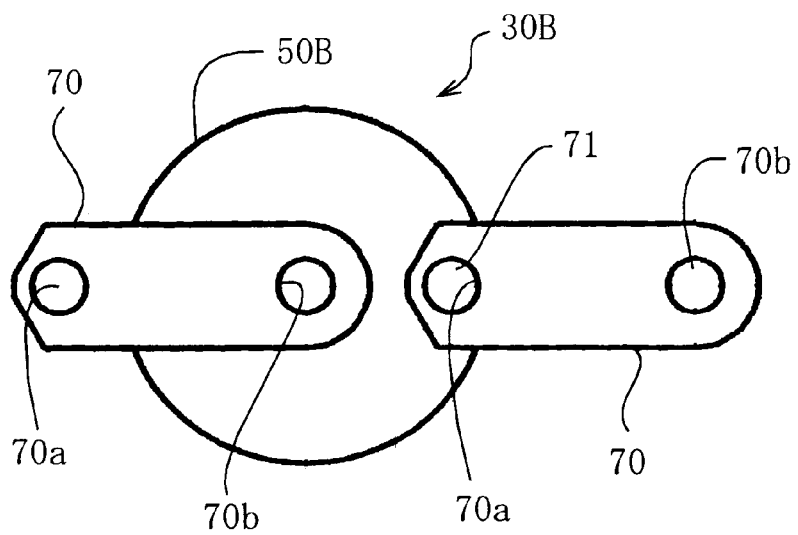
FIG. 10 is a bottom plane view of an arrangement of the bus bar.

FIGS. 8 to 10 show an arrangement of the design of a bus bar plate. In the bus bar plate 30B, two common bus bars 70 are connected to the terminal connecting portion 37 consisting of the positive bus bar terminal 40A and the negative bus bar terminal 50B by a pair of connecting through hole 70a and 70b formed at the two ends of the bus bar 70. More specifically, the positive bus bar terminal 40A is directly connected to the through hole 70b of one of the bus bars 70 by caulking. The negative bus bar terminal 50B is connected to the through hole 70a of the other bus bar 70 by caulking via a pin 71. According to such a design, several kinds of bus bars such as the bus bars 31, 32, and 33 in the first embodiment are not needed, and the manufacturing cost can be reduced.

C. Design of Cell

Figure 11A:
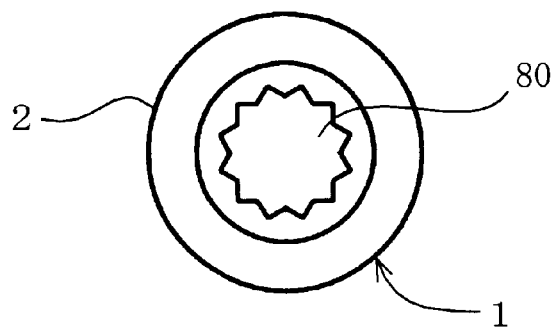
FIG. 11A is a plane view of an arrangement of the cell provided with an engaging portion with a tool.
Figure 11B:
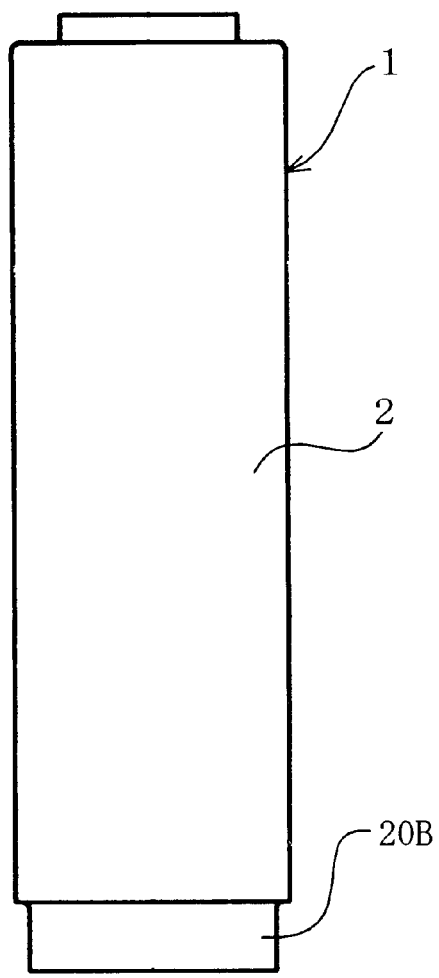
FIG. 11B is a side view thereof.
Figure 12A:
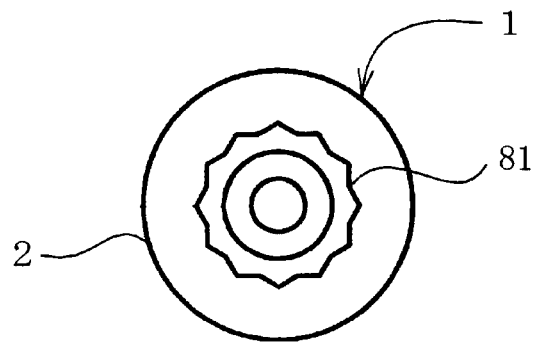
FIG. 12A is a plane view of another arrangement of the cell provided with an engaging portion with a tool.
Figure 12B:
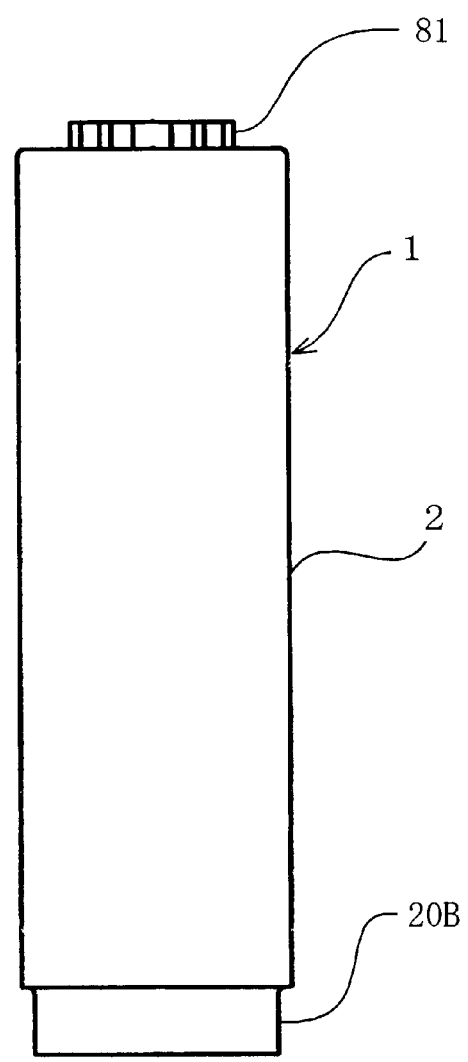
FIG. 12B is a side view thereof.

The cell 1 shown in FIGS. 11 and 12 includes a tool engaging portion for rotating the cell 1 around the axis thereof at the end surface of the head opposite to the end portion where the terminals 10A and 20B are provided. The tool engaging portion in FIG. 11 is a star-shaped hole 80. The tool engaging portion in FIG. 12 is a star-shaped protrusion 81. According to the cells 1, strong securing torque can be applied to the cells 1 by a tool engaged to the tool engaging portion (through hole 80 and protrusion 81) and the connecting strength of the cells 1 can be improved in screwing and securing the cells 1 to the terminal connecting portion 37 of the bus bar plate 30.

Figure 13A:
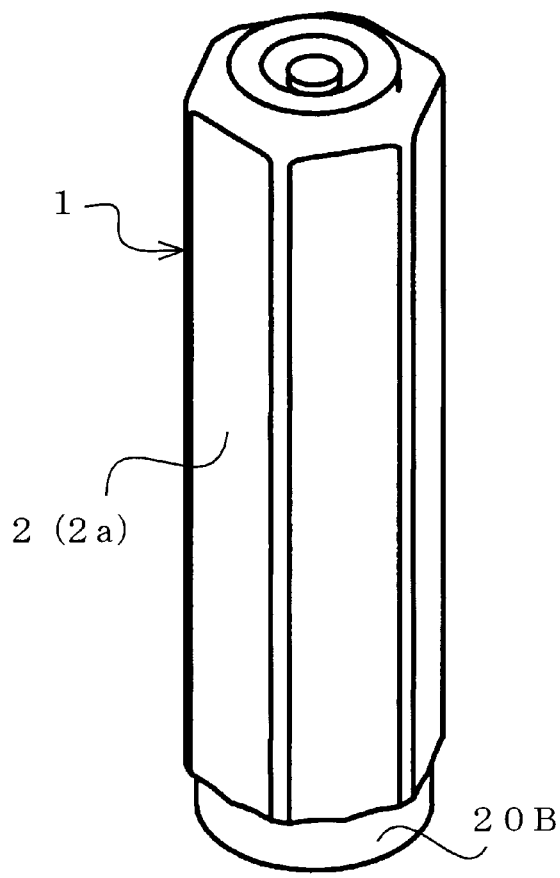
FIGS. 13A and 13B are perspective views of further arrangement of the cell provided with an engaging portion with a tool.
Figure 13B:
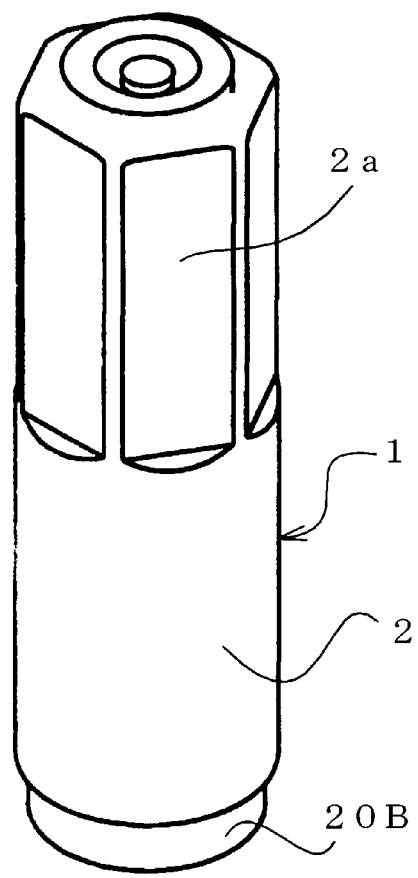

In the cell 1 shown in FIG. 13A, the casing 2 has a hexagonal cross section extending over the entire length thereof, and entire the casing 2 forms a tool engaging portion 2a. In the cell 1 shown in FIG. 13B, the casing 2 has a hexagonal cross section extending over half the total length thereof, and that portion forms a tool engaging portion 2a. According to the cells 1, strong securing torque can be applied to the cell 1 by fitting a cylindrical wrench to the head portion of the casing 2, namely the head portion of the tool engaging portion 2a, and rotating the cell 1.

(2) Second Embodiment

The second embodiment of the invention will be explained with reference to FIGS. 14 to 16 hereinafter.

The second embodiment is the same as the first embodiment in the structure in which the positive and negative terminals are provided at one end of a cell, but differs from the first embodiment in the structure in which the screw portion of the cell, which is a mounting portion to a bus bar, is formed on a columned inner cell terminal, and a bus bar plate has a structure corresponding to the screw portion.

Figure 14:
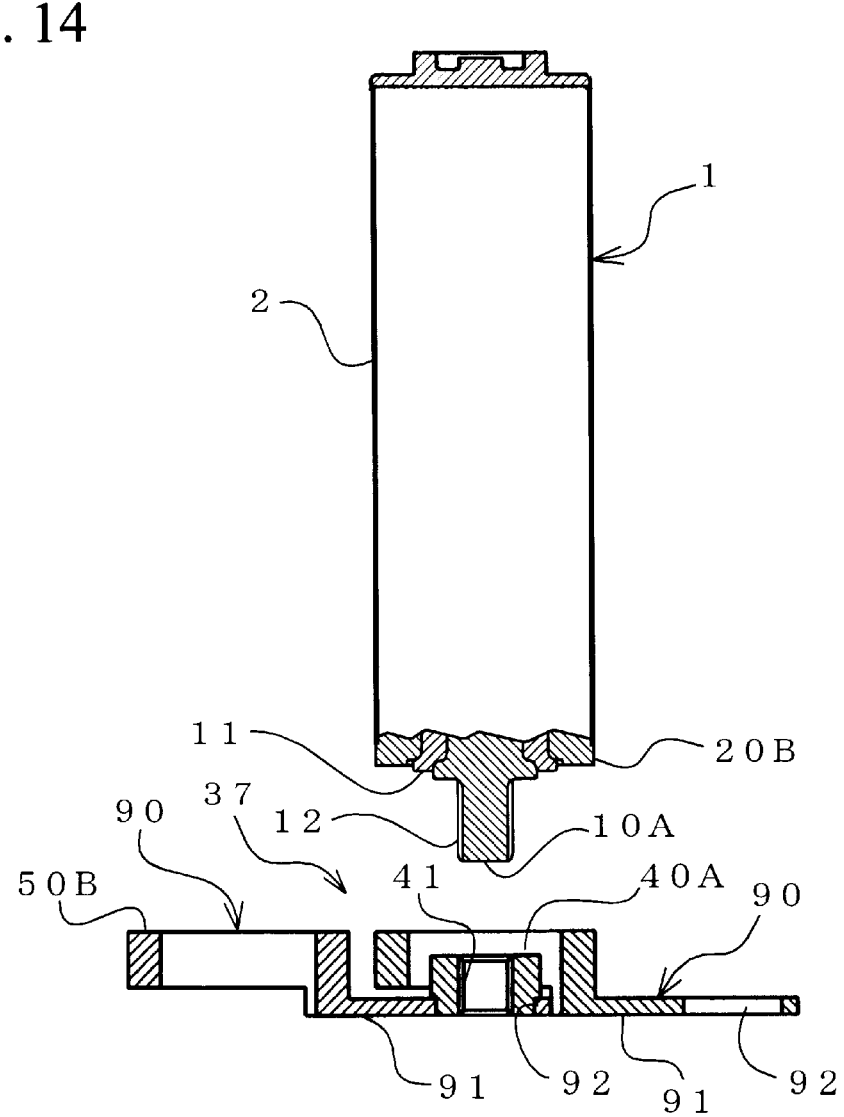
FIG. 14 is a cross section of a cell module according to a second embodiment of the invention, which shows the condition before cells are mounted to a bus bar plate.

As shown in FIG. 14, a positive cell terminal 10A and a negative cell terminal 20B are coaxially aligned with the casing 2. The negative cell terminal 20B is ring-shaped and forms an end surface of the cell 1. The positive cell terminal 10A is a solid columnar protrusion, which is disposed inside the negative cell terminal 20B and is projected from the negative cell terminal 20B. A female screw 12 is formed on the outer surface of the positive cell terminal 10A. A ring-shaped insulating member 11 is held between the positive cell terminal 10A and the negative cell terminal 20B.

Figure 15:
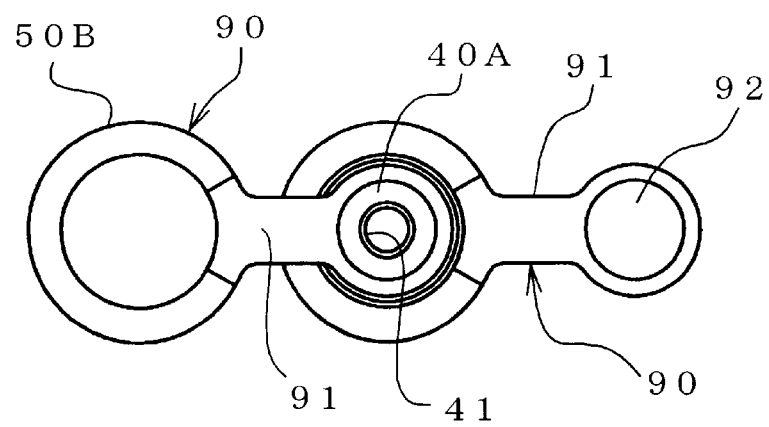
FIG. 15 is a bottom plane view of a bus bar according to the second embodiment of the invention.
Figure 16:
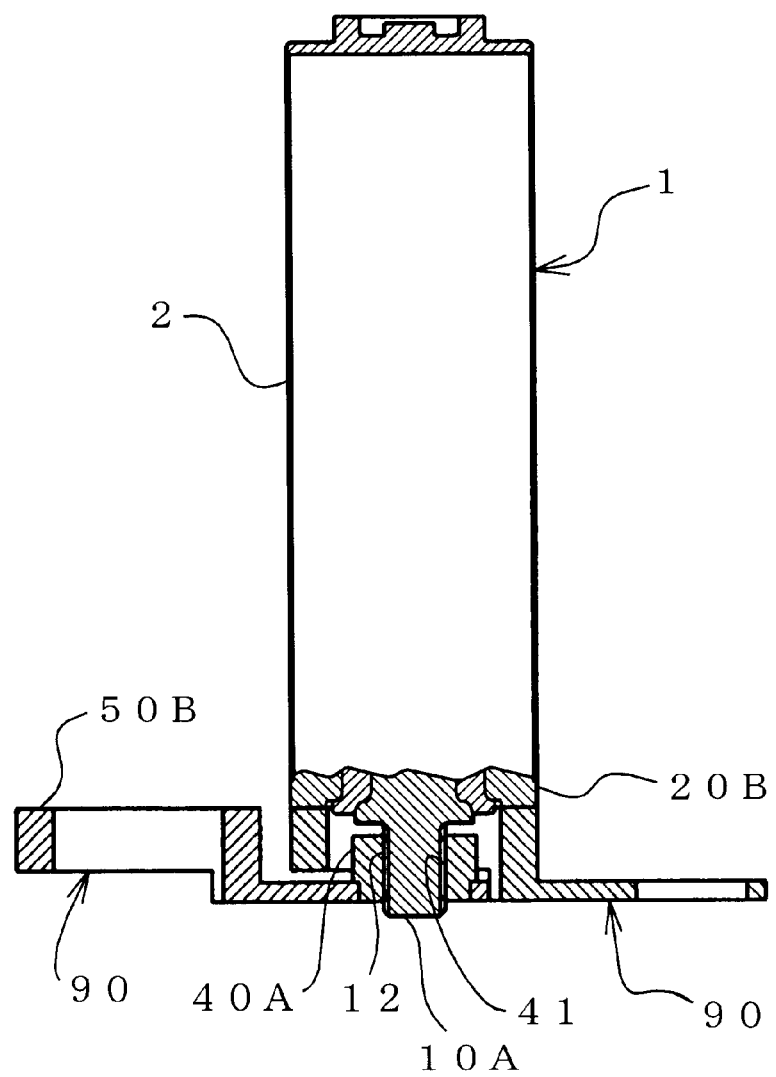
FIG. 16 is a cross section of a cell module according to the second embodiment of the invention, which shows the condition in which cells are mounted to a bus bar plate.

FIGS. 14 to 16 show an intermediate bus bar 90 which is similar to the intermediate bus bar 33 in the first embodiment. As shown in FIGS. 14 and 15, the intermediate bus bar 90 consists of a bus bar body 91 formed into a rectangular plate and a ring-shaped negative bus bar terminal 50B integrally formed with the bus bar body 91 at the end thereof. A through hole 92 for caulking is formed at the other end of the bus bar body 91, to which a positive bus bar terminal 40A is secured by caulking. The positive bus bar terminal 40A is ring-shaped, on which inner surface is formed with a female screw 41 which can screw with a male screw 12 formed on the positive cell terminal 10A of the cell 1.

The bus bar plate is constructed by assembling the plural intermediate bus bars 90. The positive bus bar terminal 40A is inserted into the negative bus bar terminal 50B from the reverse side (lower side in FIG. 14) thereof, and the bus bar bodies 91 are straightly aligned, and thus the bus bar plate is assembled. The assembled condition of the intermediate bus bar 90 is maintained by a resin mold (not shown) which forms a bus bar plate in a manner similar to that in the first embodiment. Approximately the entire clearance between the outer surface of the positive bus bar terminal 40A and the inner surface of the negative bus bar terminal 50B is filled with the resin mold. In the assembled condition of the bus bar, a terminal connecting portion 37 is formed by a pair of positive bus bar terminals 40A and the negative bus bar terminals 50B.

In the embodiment, the end or head portion of the cell 1, which end is not provided with the positive cell terminal 10A and the negative cell terminal 20B, is held, and the male screw 12 of the positive cell terminal 10A of the cell 1 is fitted to the female screw 41 of the positive bus bar terminal 40A of the bus bar 90. The cell 1 is rotated around the axis thereof in the screwing direction. The positive cell terminal 10A of the cell 1 is screwed to the positive bus bar terminal 40A of the bus bar 90, and the negative cell terminal 20B of the cell 1 is brought into contact with the negative bus bar terminal 50B of the bus bar 90. In this condition, a space for screwing remains between the positive cell terminal 10A and the positive bus bar terminal 40A. The cell 1 is further forced to rotate in the screwing direction, so that the positive cell terminal 10A is secured to the positive bus bar terminal 40A. The above operation is repeated for each cell 1, thus the cell module can be obtained.

As shown in FIG. 16, the positive cell terminal 10A and the positive bus bar terminal 40A of the bus bar 90 are contacted to each other by the screw securing in the cell 1. The negative cell terminal 20B is brought into contact with the negative bus bar terminal 50B by the screwing of the cell 1. By virtue of this connection, the positive cell terminal 10A and the negative cell terminal 20B of the cell 1 are serially connected to each other via the terminal connecting portion 37 of the bus bar 90, and the cell module is constructed. Also in this embodiment, the same effects and advantages as in the first embodiment can be obtained by the connecting structure in which cell 1 is screwed to the bus bar 90.

(3) Third Embodiment

A third embodiment of the invention will be explained hereinafter with reference to FIGS. 17A and 17B.

A cylindrical negative cell terminal 20B is provided at an end (lower end in FIG. 17A) of a cell 1 having a cylindrical casing 2 as a main body. A positive cell terminal 10A formed into a columnar projection is coaxially aligned with the negative cell terminal 20B. The heights of the terminals 20B and 10A are identical with each other so that the end surfaces thereof are positioned in a common plane.

Figure 17A:
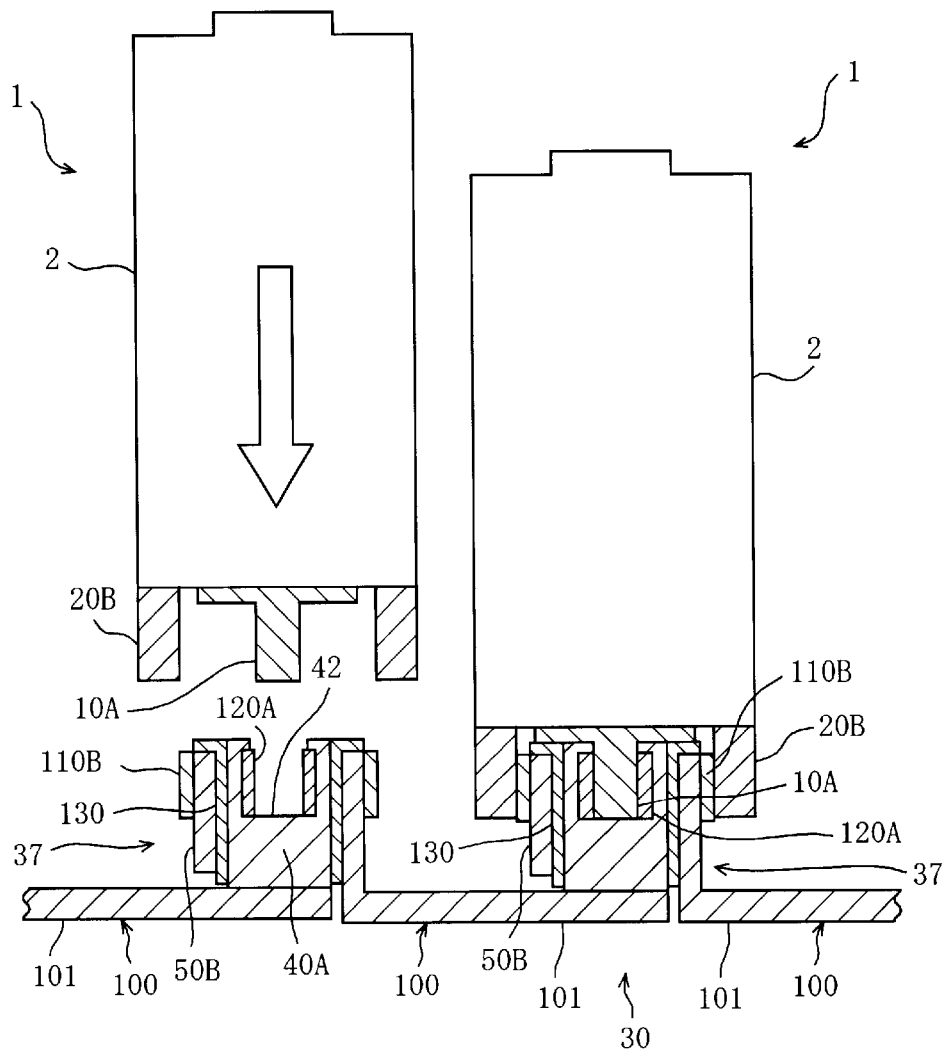
FIG. 17A is a cross section of a cell module according to a third embodiment of the invention.

Reference numeral 100 in FIG. 17A is a bus bar similar to the intermediate bus bar 33 in the first embodiment. A part of a bus bar plate 30 is formed by assembling bus bars 100. The bus bar 100 consists of a bus bar body 101, cylindrical negative bus bar terminal 50B integrally formed with the bus bar body 101 at an end thereof, and a cylindrical positive bus bar terminal 40A fixed to the bus bar body 101 by welding, or the like, at the other end thereof. A conductive outer socket 110B with a ring-shape is fixed to the outer surface of the end portion of the negative bus bar terminal 50B. A recess 42 having a circular cross section is formed at the center of the positive bus bar terminal 40A. A conductive inner socket 120A with a ring-shape is fitted to the inner surface of the recess 42.

A cylindrical insulating member 130 is fitted into the negative bus bar terminal 50B, the positive bus bar terminal 40A is inserted into the insulating member 130 from the reverse side (lower side in FIG. 17A) thereof, and thus the bus bars 100 are connected to each other. In the assembled condition of the bus bars 100, a terminal connecting portion 37 is formed by a pair of positive bus bar terminals 40A and the negative bus bar terminals 50B.

An engaging device is provided at the inner surface of the negative cell terminal 20B of the cell 1 and the outer surface of the outer socket 110B. The engaging device facilitates the engagement and the removal of the negative cell terminal 20B and the outer socket 110B in the axial direction thereof. An engaging device is provided at the outer surface of the positive cell terminal 10A of the cell 1 and the inner surface of the inner socket 120A. The engaging device facilitates the engagement and the removal of the positive cell terminal 10A and the inner socket 120A in the axial direction thereof.

Figure 17B:
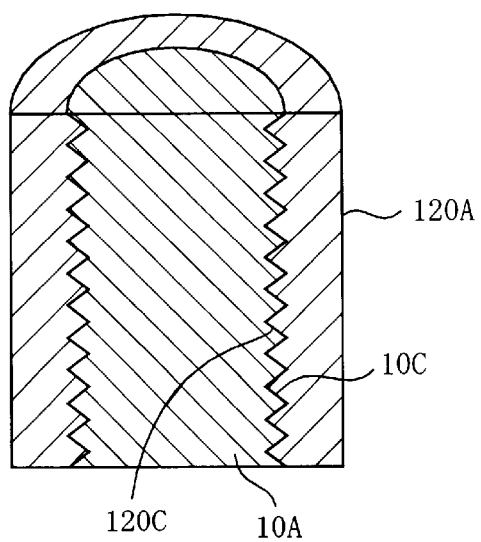
FIG. 17B is an enlarged cross section of a part of FIG. 17A.
Figure 18:
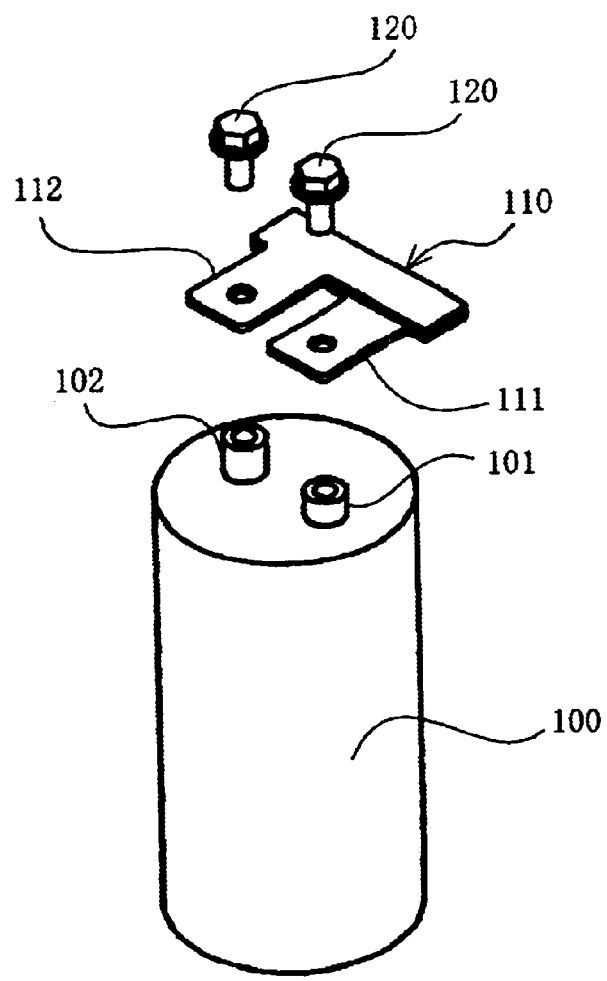
FIG. 18 is a perspective view of a conventional cell module.

FIG. 17B is a cross section showing the engaging device of the positive cell terminal 10A and inner socket 120A, and a similar engaging device is provided to the negative cell terminal 20B and the outer socket 110B. As shown in FIG. 17B, a serration extending along the circumferential direction 10C is formed on the outer surface of the positive cell terminal 10A. The inner surface of the inner socket 120A is formed with a serration 120C which engages with the serration 10C of the positive cell terminal 10A. When the positive cell terminal 10A is fitted into the inner socket 120A and the positive cell terminal 10A is extracted therefrom, the inner socket 120A is elastically deformed so as to enable fitting and removing. In the case of the negative cell terminal 20B and the outer socket 110B, the outer socket 110B is deformed.

In the embodiment, the end (head portion) of the cell 1, which end is not provided with the positive cell terminal 10A and the negative cell terminal 20B, is held and moved in the axial direction, and the positive cell terminal 10A is fitted into the inner socket 120A in the positive bus bar terminal 40A, and simultaneously, the negative cell terminal 20B is fitted into the outer socket 110B of the negative bus bar terminal 50B. When the end of the positive cell terminal 10A is brought into contact with the bottom of the positive bus bar terminal 40A, the fitting is accomplished. The end of the positive cell terminal 10A is directly connected to the bottom of the positive bus bar terminal 40A and the inner surface thereof via inner socket 120A. The negative cell terminal 20B is connected to the outer surface of the negative bus bar terminal 50B via outer socket 110B. Thus, the positive cell terminal 10A and the negative cell terminal 20B are connected to each other via the terminal connecting portion 37 of the bus bar 100, and the cell module is assembled.

In the embodiment, the cell 1 is moved in the axial direction without rotation, and the cell terminals 10A and 20B are fitted to the bus bar terminals 40A and 50B of the terminal connecting portion 37, whereby the cell 1 is connected to the terminal connecting portion 37. Therefore, the operation for mounting and removing the cell 1 is easier than the case in which screws are used. There is further advantage in that the structure for generating securing torque in screwing and tools for screwing are not necessary.

It should be noted that the negative terminal is disposed outside and the positive terminal is disposed inside in the first through third embodiments, but the polarities can be switched each other.

What is claimed is:

1. A cell module structure in which cylindrical cells are connected to each other via a terminal connecting portion of a bus bar plate, wherein:

an inner cell terminal and an outer cell terminal having different polarities are coaxially aligned at an end of each cell;

an inner connecting terminal and an outer connecting terminal corresponding to the inner cell terminal and the outer cell terminal of each cell are coaxially aligned in the terminal connecting portion of the bus bar plate; and the inner cell terminal and the outer cell terminal of each cell are connected to the terminal connecting portion of the bus bar plate in a connected condition in which the outer cell terminal of the cell contacts the outer connecting terminal of the terminal connecting portion, and the inner cell terminal contacts the inner connecting terminal.

2. A cell module structure according to claim 1, wherein the terminal connecting portion of the bus bar plate has a contacting portion for contacting each cell terminal of the cell, and each cell terminal is welded or adhered to the contacting portion.

3. A cell module structure according to claim 1, wherein the plural terminal connecting portions are straightly aligned on a surface of the bus bar plate, and the plural cells are connected to the terminal connecting portions in the connected condition.

4. A cell module structure according claim 1, wherein the plural terminal connecting portions are straightly aligned on both surfaces of the bus bar plate, and the plural cells are connected to the terminal connecting portions in the connected condition.

5. A cell module structure in which cylindrical cells are connected to each other via a terminal connecting portion of a bus bar plate, wherein:

an inner cell terminal and an outer cell terminal having different polarities are coaxially aligned at an end of each cell, at least the outer cell terminal is formed in a cylinder and has a screw portion on an inner surface or an outer surface thereof;

an inner connecting terminal and an outer connecting terminal corresponding to the inner cell terminal and the outer cell terminals of each cell are coaxially aligned at the terminal connecting portion of the bus bar plate, and a screw portion screwed into the screw portion of the outer cell terminal is formed at the outer connecting terminal; and the inner cell terminal and the outer cell terminal of each cell are connected to the terminal connecting portion of the bus bar plate in a connected condition in which the screw portion of the outer cell terminal in each cell is screwed to the screw portion of the outer connecting terminal in the terminal connecting portion, so that the inner cell terminal is brought into contact with the inner connecting terminal.

6. A cell module structure according to claim 5, wherein the plural terminal connecting portions are straightly aligned on a surface of the bus bar plate, and the plural cells are connected to the terminal connecting portions in the connected condition.

7. A cell module structure according claim 5, wherein the plural terminal connecting portions are straightly aligned on both surfaces of the bus bar plate, and the plural cells are connected to the terminal connecting portions in the connected condition.

8. A cell module structure in which cylindrical cells are connected to each other via a terminal connecting portion of a bus bar plate, wherein:

an inner cell terminal and an outer cell terminal having different polarities are coaxially aligned at an end of each cell, the inner cell terminal is formed in a column and has a screw portion on an outer surface thereof;

an inner connecting terminal and an outer connecting terminal corresponding to the inner cell terminal and the outer cell terminals of each cell are coaxially aligned at the terminal connecting portion of the bus bar plate, and a screw portion screwing the screw portion of the inner cell terminal is formed at the inner connecting terminal; and the inner cell terminal and the outer cell terminal of each cell are connected to the terminal connecting portion of the bus bar plate in a condition in which the screw portion of the inner cell terminal in each cell is screwed to the screw portion of the inner connecting terminal in the terminal connecting portion, so that the outer cell terminal is brought into contact with the outer connecting terminal.

9. A cell module structure according claim 8, wherein the plural terminal connecting portions are straightly aligned on a surface of the bus bar plate, and the plural cells are connected to the terminal connecting portions in the connected condition.

10. A cell module structure according claim 8, wherein the plural terminal connecting portions are straightly aligned on both surfaces of the bus bar plate, and the plural cells are connected to the terminal connecting portions in the connected condition.

* * * * *